(12) United States Patent
Sugahara

(10) Patent No.: US 11,840,004 B2
(45) Date of Patent: Dec. 12, 2023

(54) INJECTION MOLDING MACHINE

(71) Applicant: FANUC CORPORATION, Minamitsuru-gun (JP)

(72) Inventor: Keisuke Sugahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 117 days.

(21) Appl. No.: 17/003,618

(22) Filed: Aug. 26, 2020

(65) Prior Publication Data

US 2021/0060841 A1 Mar. 4, 2021

(30) Foreign Application Priority Data

Aug. 30, 2019 (JP) ................. 2019-158907

(51) Int. Cl.
| | | |
|---|---|---|
| B29C 45/76 | (2006.01) | |
| F16H 7/02 | (2006.01) | |
| F16H 57/01 | (2012.01) | |
| G01D 5/00 | (2006.01) | |
| B29C 45/17 | (2006.01) | |
| B29C 45/78 | (2006.01) | |
| B29C 45/70 | (2006.01) | |
| G01N 21/89 | (2006.01) | |

(52) U.S. Cl.
CPC ........ *B29C 45/768* (2013.01); *B29C 45/1775* (2013.01); *B29C 45/706* (2013.01); *B29C 45/78* (2013.01); *F16H 7/02* (2013.01); *F16H 57/01* (2013.01); *G01D 5/00* (2013.01); *G01N 21/8901* (2013.01); *F16H 2057/012* (2013.01)

(58) Field of Classification Search
CPC ..... B29C 45/768; B29C 45/1775; F16H 7/02; F16H 57/01
See application file for complete search history.

(56) References Cited

U.S. PATENT DOCUMENTS 6,238,312 B1* 5/2001 Tsubata ............... F16H 57/0489
474/146
9,228,909 B1* 1/2016 Rembisz ................... G01L 3/14
(Continued)

FOREIGN PATENT DOCUMENTS

| JP | S 54-030177 U | 2/1979 |
|---|---|---|
| JP | S 55-181056 U | 12/1980 |

(Continued)

OTHER PUBLICATIONS

Machine Translation JPH0716901A (Year: 1995).*
(Continued)

*Primary Examiner* — Matthew J Daniels
*Assistant Examiner* — Wayne K. Swier
(74) *Attorney, Agent, or Firm* — MCGINN I.P. LAW GROUP, PLLC

(57) ABSTRACT

An injection molding machine includes a belt transmission mechanism (mold opening/closing mechanism, ejector mechanism, screw drive mechanism, injection mechanism) configured to transmit drive force from a driving shaft (driving pulley) to a driven shaft (driven pulley) by means of a belt. The injection molding machine includes: a cover covering part or entirety of the belt; and a sensor attached to the cover and configured to detect an abnormality of the belt.

14 Claims, 9 Drawing Sheets

(56) References Cited

U.S. PATENT DOCUMENTS

| | | | | |
|---|---|---|---|---|
| 2008/0057146 A1* | 3/2008 | Nishimura | ............... | B29C 45/84 425/138 |
| 2008/0123113 A1* | 5/2008 | Iwayama | ............. | G01B 11/043 156/134 |
| 2011/0313719 A1* | 12/2011 | Yamaguchi | ............. | F16H 59/70 702/150 |
| 2012/0027882 A1* | 2/2012 | Komamura | ............. | B29C 45/76 425/169 |

FOREIGN PATENT DOCUMENTS

| | | | | | |
|---|---|---|---|---|---|
| JP | H07-16901 A | * | 1/1995 | ........... | B29C 45/768 |
| JP | H 09-125980 A | | 5/1997 | | |
| JP | 11174932 A | * | 7/1999 | | |
| JP | 2001194270 A | * | 7/2001 | ........... | F01D 21/003 |
| JP | 2002-181143 A | | 6/2002 | | |
| JP | 2003-050158 A | | 2/2003 | | |
| JP | 2003-120769 A | | 4/2003 | | |
| JP | 2005346872 A | * | 12/2005 | | |
| JP | 2009-028997 A | | 2/2009 | | |
| JP | 2009-241425 A | | 10/2009 | | |
| JP | 2010-284931 A | | 12/2010 | | |
| JP | 2012-161995 A | | 8/2012 | | |
| JP | 2015-128874 A | | 7/2015 | | |
| JP | 2017106729 A | * | 6/2017 | | |
| JP | 2019-074506 A | | 5/2019 | | |
| WO | WO-2016104125 A1 | * | 6/2016 | ............. | B65G 23/44 |
| WO | WO-2018221577 A1 | * | 12/2018 | ........... | F01D 21/003 |

OTHER PUBLICATIONS

Machine Translation JP11184932A (Year: 1999).*
J. Smoot Nov. 20, 2018 Rotary Encoder options: Absolute or Incremental? (Year: 2018).*
Machine Translation JP2002181143A (Year: 2002).*
Machine translation WO2016104125A1 (Year: 2017).*
Machine translation JP2001194270A (Year: 2001).*
Machine translation JP2005346872A (Year: 2005).*
Machine translation JP2017106729A (Year: 2017).*
Machine translation WO2018221577A1 (Year: 2018).*
Japanese Office Action, dated Feb. 7, 2023, in Japanese Application No. 2019-158907 with an English Translation thereof.

* cited by examiner

US 11,840,004 B2

INJECTION MOLDING MACHINE

CROSS-REFERENCE TO RELATED APPLICATION

This application is based upon and claims the benefit of priority from Japanese Patent Application No. 2019-158907 filed on Aug. 30, 2019, the contents of which are incorporated herein by reference.

BACKGROUND OF THE INVENTION

Field of the Invention

The present invention relates to an injection molding machine having a belt transmission mechanism that transmits drive force from a driving shaft to a driven shaft by means of a belt.

Description of the Related Art

Japanese Laid-Open Patent Publication No. 2012-161995 discloses an injection molding machine having a belt transmission mechanism that transmits drive force (power) from a driving shaft to a driven shaft by means of a belt. The injection molding machine includes a driving pulley on the driving shaft side, a driven pulley on the driven shaft side, a belt for transmitting drive force from the driving pulley to the driven pulley, and a sound-proof cover covering the driving pulley, driven pulley, and belt.

SUMMARY OF THE INVENTION

In an injection molding machine having a belt transmission mechanism, damage to the belt, such as cracks etc., reduces belt tension and causes lag in operation of the injection molding machine. Further, the injection molding machine has to be stopped if the belt has broken. It is hence desirable to find abnormalities of the belt in the early stages in order to prevent operation lag and stoppage of the injection molding machine.

Accordingly, an object of the present invention is to provide an injection molding machine that can find belt abnormalities in the early stages.

According to an aspect of the present invention, there is provided an injection molding machine having a belt transmission mechanism configured to transmit drive force from a driving shaft to a driven shaft by use of a belt. The injection molding machine includes: a cover covering part or entirety of the belt; and a sensor attached to the cover and configured to detect an abnormality of the belt.

According to the present invention, it is possible to find belt abnormalities in the early stages, to utilize the cover as part of a detection device for detecting belt abnormalities, and to prevent increase in the size of the injection molding machine.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The injection molding machine according to the present invention will be described in detail below in connection with preferred embodiments while referring to the accompanying drawings.

1. Configuration of Injection Molding Machine 10

Figure 1:
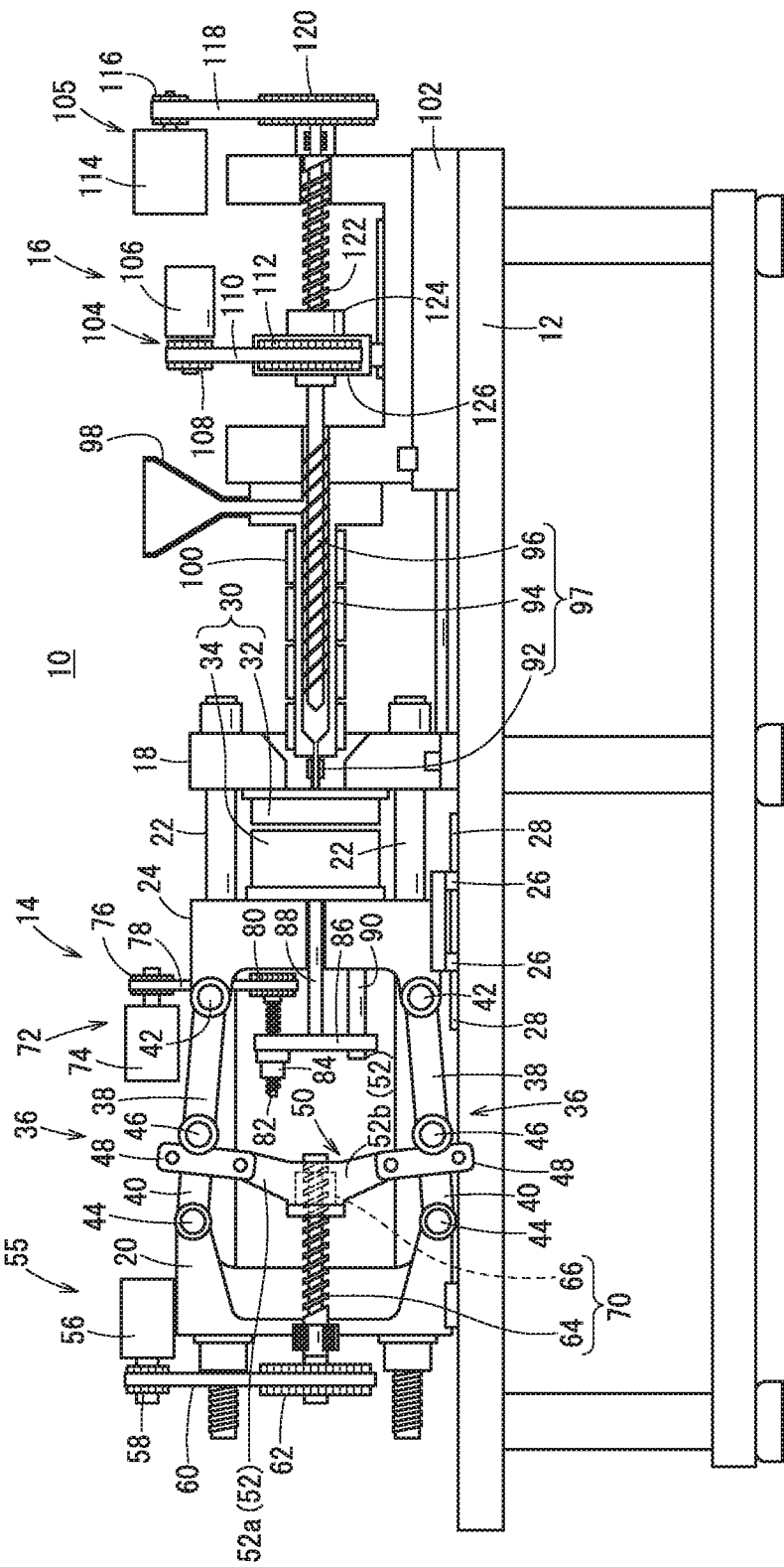
FIG. 1 is a schematic diagram illustrating the configuration of an injection molding machine viewed from a side.

FIG. 1 is a schematic diagram illustrating the configuration of an injection molding machine 10. The injection molding machine 10 includes a base 12, and a clamping device 14, and an injection device 16 provided on the base 12.

[1.1. Configuration of Clamping Device 14]

The clamping device 14 includes a stationary platen 18, a rear platen 20, and four tie bars 22. The four tie bars 22 couple the stationary platen 18 and the rear platen 20. The four tie bars 22 are arranged so that their axial directions are parallel to each other. A movable platen 24 is provided between the stationary platen 18 and the rear platen 20. The movable platen 24 is provided on the base 12 with a sliding unit 26 interposed therebetween. The sliding unit 26 can move along guide rails 28 provided on the base 12. The movable platen 24 can thus move forward and backward relative to the stationary platen 18 along the axial direction of the tie bars 22.

A mold 30 is provided between the stationary platen 18 and the movable platen 24. The mold 30 includes a fixed mold 32 and a movable mold 34. The fixed mold 32 is attached to a side of the stationary platen 18 that faces the movable platen 24, and the movable mold 34 is attached to a side of the movable platen 24 that faces the stationary platen 18.

Toggle links 36 are provided between the rear platen 20 and the movable platen 24. A total of four toggle links 36 are provided, two on each of upper and lower sides. Each toggle link 36 includes a first link rod 38, a second link rod 40, a first toggle pin 42, a second toggle pin 44, and a third toggle pin 46. One end of the first link rod 38 is pivotably connected to the movable platen 24 through the first toggle pin 42. One end of the second link rod 40 is pivotably connected to the rear platen 20 through the second toggle pin 44. The other end of the first link rod 38 and the other end of the second link rod 40 are pivotably connected to each other through the third toggle pin 46.

The second link rods 40 are connected to a crosshead 50 through cross links 48. The crosshead 50 includes arms 52 (an upper arm 52a, a lower arm 52b) extending upward and downward, and the cross links 48 are connected to the ends of the respective arms 52. The rear platen 20 has guide rods (not shown). The guide rods (not shown) are arranged so that their axial direction is parallel to the axial direction of the tie bars 22. The crosshead 50 is guided by the guide rods (not shown) to move forward and backward in the direction parallel to the axial direction of the tie bars 22.

The clamping device 14 includes a mold opening/closing mechanism 55 for opening and closing the mold 30. The mold opening/closing mechanism 55 includes a servomotor 56, a driving pulley 58, a belt 60, a driven pulley 62, a ball screw 64, and a ball screw nut 66. The ball screw 64 is arranged so that its axial direction is parallel to the axial direction of the tie bars 22.

Figure 2:
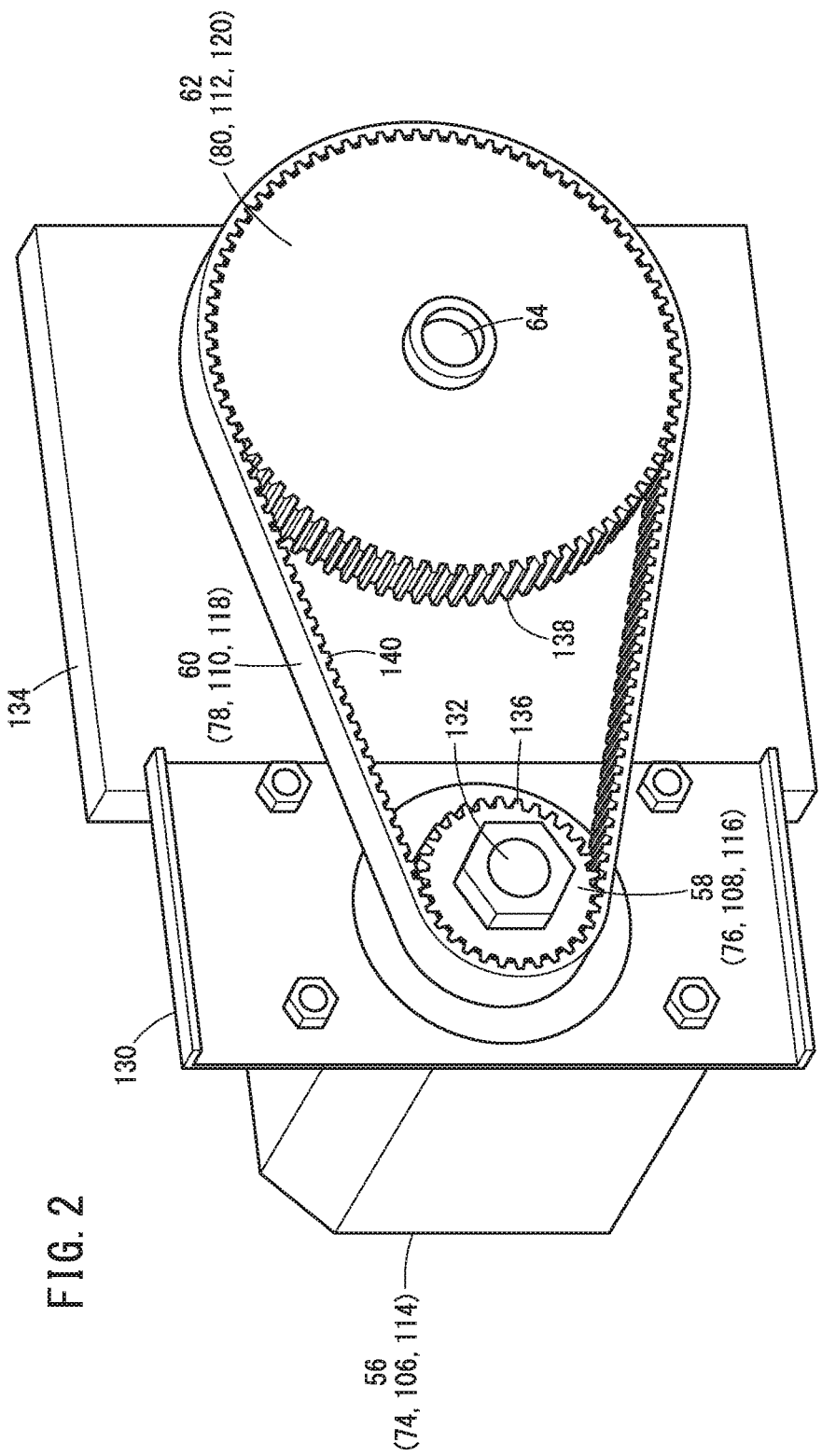
FIG. 2 is a schematic diagram illustrating the configuration of a belt transmission mechanism having no cover.

The driving pulley 58 can rotate integrally with a rotary shaft 132 of the servomotor 56 (FIG. 2 etc.), and the driven pulley 62 can rotate integrally with the ball screw 64. The belt 60 is wound around the driving pulley 58 and the driven pulley 62, so as to transmit rotational power (rotational force) of the driving pulley 58 to the driven pulley 62. The ball screw nut 66 is screw-engaged with the ball screw 64 and moves along the ball screw 64 as the ball screw 64 rotates. The ball screw nut 66 is fixed to the crosshead 50.

As the servomotor 56 rotates, the rotational force is transmitted to the ball screw 64 through the driving pulley 58, the belt 60, and the driven pulley 62, causing the ball screw 64 to rotate. As the ball screw 64 rotates, the crosshead 50 moves along the guide rods (not shown) together with the ball screw nut 66. The movement of the crosshead 50 causes the movable platen 24 to move along the axial direction of the tie bars 22, through the cross links 48 and the toggle links 36. The ball screw 64 and the ball screw nut 66 constitute a reciprocating mechanism 70 for moving the crosshead 50 forward and backward.

As the movable platen 24 moves toward the stationary platen 18, the movable mold 34 abuts on the fixed mold 32 to close the mold 30. On the other hand, as the movable platen 24 moves toward the rear platen 20, the movable mold 34 separates apart from the fixed mold 32 to open the mold 30.

The clamping device 14 includes an ejector mechanism 72 for ejecting a molded article from the movable mold 34. The ejector mechanism 72 includes a servomotor 74, a driving pulley 76, a belt 78, a driven pulley 80, a ball screw 82, a ball screw nut 84, an ejector plate 86, ejector pins 88, and a guide rod 90. The ball screw 82 and the guide rod 90 are arranged so that their axial direction is parallel to the axial direction of the tie bars 22.

The driving pulley 76 can rotate integrally with the rotary shaft of the servomotor 74, and the driven pulley 80 can rotate integrally with the ball screw 82. The belt 78 is wound around the driving pulley 76 and the driven pulley 80, so as to transmit the rotational force of the driving pulley 76 to the driven pulley 80. The ball screw nut 84 is screw-engaged with the ball screw 82 and moves along the ball screw 82 as the ball screw 82 rotates. The ball screw nut 84 is fixed to the ejector plate 86 having the ejector pins 88.

As the servomotor 74 rotates, the rotational force is transmitted to the ball screw 82 through the driving pulley 76, the belt 78, and the driven pulley 80, causing the ball screw 82 to rotate. As the ball screw 82 rotates, the ejector plate 86 and the ejector pins 88 move along the guide rod 90 together with the ball screw nut 84. As the ejector pins 88 move toward the movable platen 24, the molded article is pushed out and removed from the movable mold 34.

[1.2. Configuration of Injection Device 16]

The injection device 16 includes a nozzle 92, a cylinder 94, a screw 96, a hopper 98, and a heater 100. The nozzle 92, cylinder 94, and screw 96 will be referred to as an injection unit 97. The nozzle 92 is provided at an end of the cylinder 94. The cylinder 94 is a hollow member through which the screw 96 passes. The cylinder 94 and the screw 96 extend in the direction in which the mold 30 opens and closes. The cylinder 94 is provided with the hopper 98. The hopper 98 serves to load (supply) resin material into the cylinder 94. If the resin material loaded from the hopper 98 is in the form of pellets, the resin pellets are melted by the heater 100.

The injection device 16 is provided on the base 12 with an extruder base 102 interposed therebetween. The extruder base 102 moves the injection device 16 along the direction in which the mold 30 opens and closes. The injection device 16 includes a screw drive mechanism 104 for rotating the screw 96 and an injection mechanism 105 for injecting the resin material from the nozzle 92.

The screw drive mechanism 104 includes a servomotor 106, a driving pulley 108, a belt 110, and a driven pulley 112.

The driving pulley 108 can rotate integrally with the rotary shaft of the servomotor 106, and the driven pulley 112 can rotate integrally with the screw 96. The belt 110 is wound around the driving pulley 108 and the driven pulley 112 so as to transmit the rotational force of the driving pulley 108 to the driven pulley 112.

As the servomotor 106 rotates, the rotational force is transmitted to the screw 96 through the driving pulley 108, the belt 110, and the driven pulley 112, causing the screw 96 to rotate. As the screw 96 rotates, the resin material is delivered toward the nozzle 92.

The injection mechanism 105 includes a servomotor 114, a driving pulley 116, a belt 118, a driven pulley 120, a ball screw 122, a ball screw nut 124, and a pusher plate 126. The ball screw 122 is arranged so that its axial direction is parallel to the axial direction of the screw 96.

The driving pulley 116 can rotate integrally with the rotary shaft of the servomotor 114, and the driven pulley 120 can rotate integrally with the ball screw 122. The belt 118 is wound around the driving pulley 116 and the driven pulley 120, so as to transmit the rotational force of the driving pulley 116 to the driven pulley 120. The ball screw nut 124 is screw-engaged with the ball screw 122 and moves along the ball screw 122 as the ball screw 122 rotates. The ball screw nut 124 is fixed to the pusher plate 126.

As the servomotor 114 rotates, the rotational force is transmitted to the ball screw 122 through the driving pulley 116, the belt 118, and the driven pulley 120, causing the ball screw 122 to rotate. As the ball screw 122 rotates, the pusher plate 126 moves along the axial direction of the ball screw 122 together with the ball screw nut 124. The movement of the pusher plate 126 causes the screw 96 to move in the cylinder 94 along the axial direction of the ball screw 122. As the screw 96 moves toward the nozzle 92, the resin material accumulated at the end of the screw 96 in the cylinder 94 is injected from the nozzle 92.

2. Configuration of Belt Transmission Mechanisms

The mold opening/closing mechanism 55, ejector mechanism 72, screw drive mechanism 104, and injection mechanism 105 shown in FIG. 1 are belt transmission mechanisms in which the belt 60, 78, 110, 118 transmits drive force (motive power) from the driving shaft to the driven shaft. The belt transmission mechanisms will be further described referring to FIG. 2. The mold opening/closing mechanism 55 will be described below as an example of the belt transmission mechanisms.

The servomotor 56 on the driving shaft side is fixed to a motor bracket 130. The driving pulley 58 (driving shaft) is fixed at an end of the rotary shaft 132 of the servomotor 56. On the other hand, the ball screw 64 on the driven shaft side is rotatably supported by a holding plate 134. The driven pulley 62 (driven shaft) is fixed to an end of the ball screw 64. Though not shown graphically, the motor bracket 130 is coupled to the holding plate 134 and the holding plate 134 is provided on the base 12 (FIG. 1), for example.

The belt 60 hung over the driving pulley 58 and the driven pulley 62 is a synchronous power transmission belt. Belt teeth 140 formed on the belt 60 mesh with driving pulley teeth 136 formed on the driving pulley 58 and driven pulley teeth 138 formed on the driven pulley 62.

Figure 3:
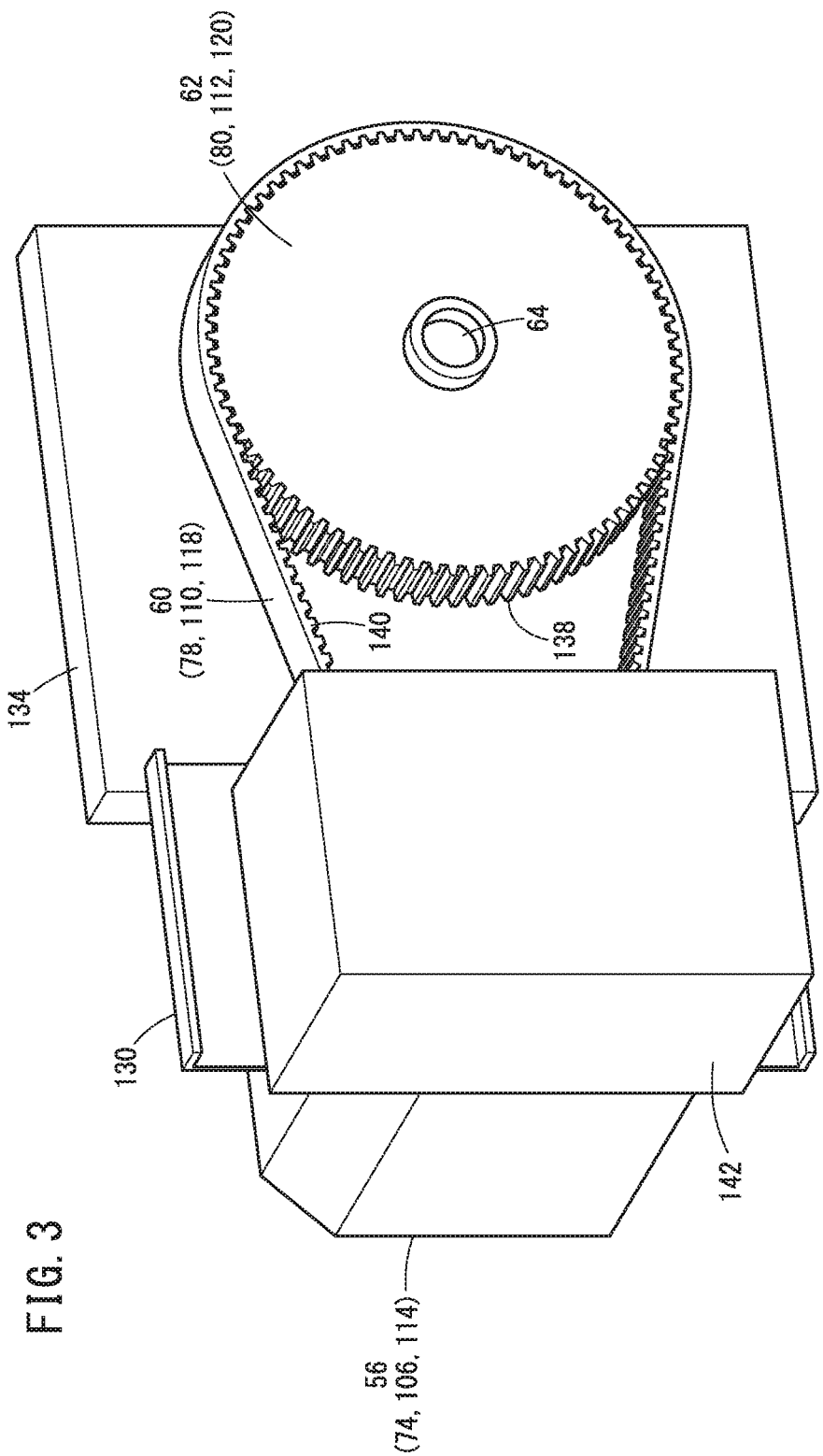
FIG. 3 is a schematic diagram illustrating the configuration of a belt transmission mechanism having a cover on the driving shaft side.
Figure 4:
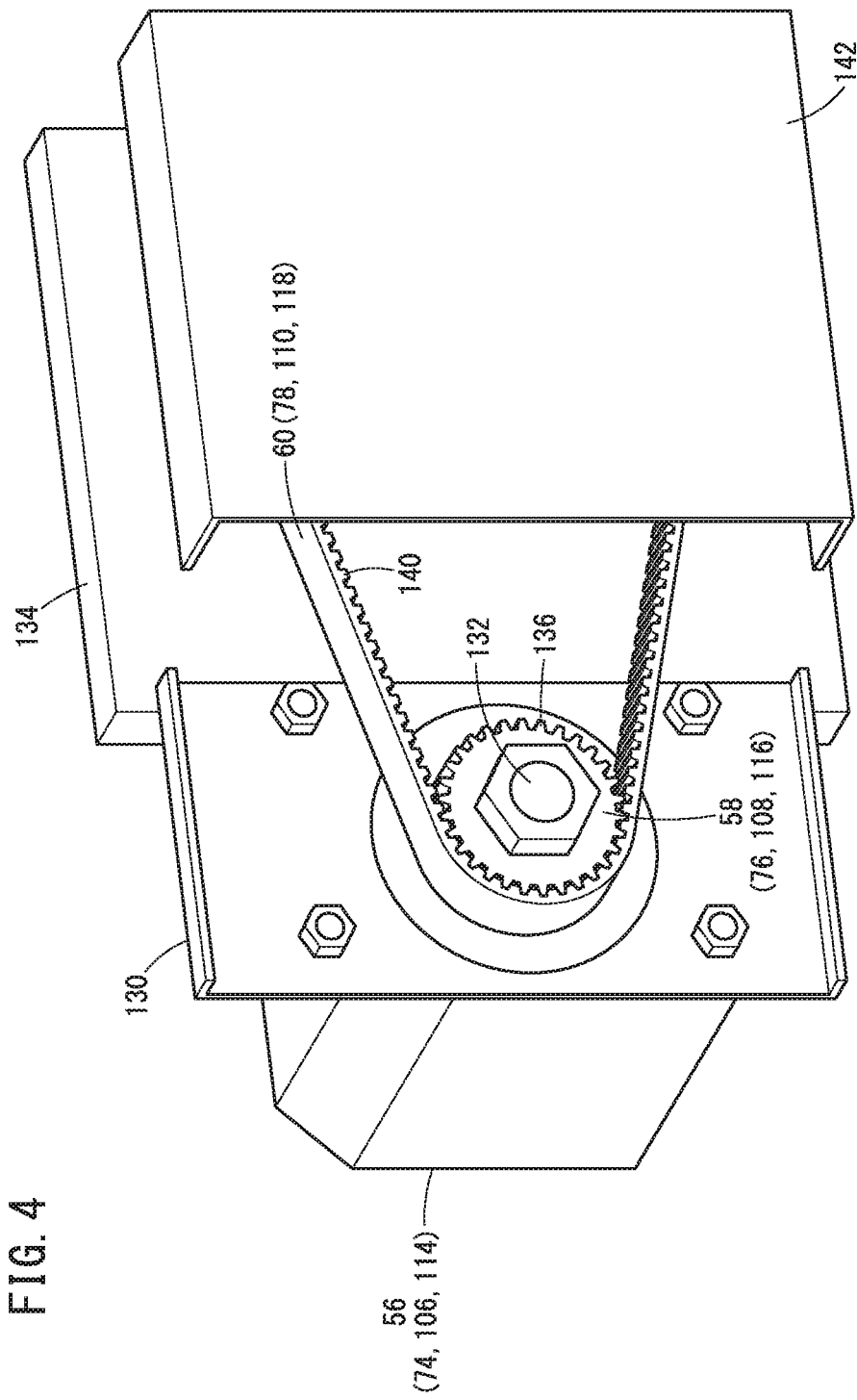
FIG. 4 is a schematic diagram illustrating the configuration of a belt transmission mechanism having a cover on the driven shaft side.
Figure 5:
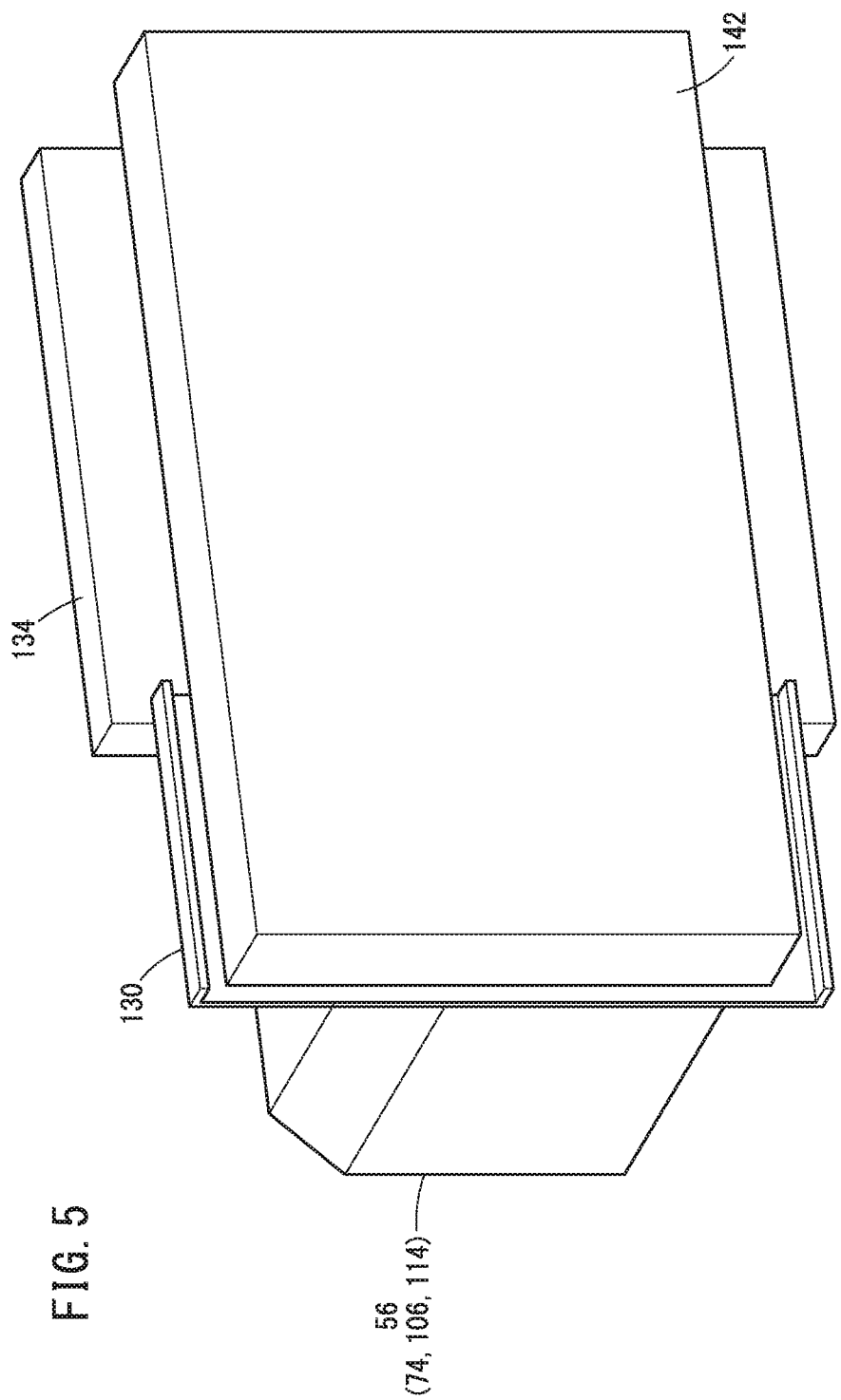
FIG. 5 is a schematic diagram illustrating the configuration of a belt transmission mechanism having a cover covering the entirety.

As shown in FIGS. 3 to 5, part or entirety of the belt 60 of the belt transmission mechanism is covered by a cover 142 so as to prevent an operator from touching the belt 60 or for the purpose of soundproofing. For example, as shown in FIG. 3, the cover 142 may cover the driving pulley 58 (FIG. 2) and part of the belt 60 wound on the driving pulley 58. Alternatively, as shown in FIG. 4, the cover 142 may cover the driven pulley 62 (FIG. 2) and part of the belt 60 wound on the driven pulley 62. Alternatively, as shown in FIG. 5, the cover 142 may cover the driving pulley 58, the driven pulley 62, and the belt 60. The cover 142 is fixed to one or both of the motor bracket 130 and the holding plate 134, but may be fixed to another part. The cover 142 may be made of metal, or casting or resin.

3. Configuration for Detecting Abnormalities of Belt 60

[3.1. Sensor 148]

Figure 6:
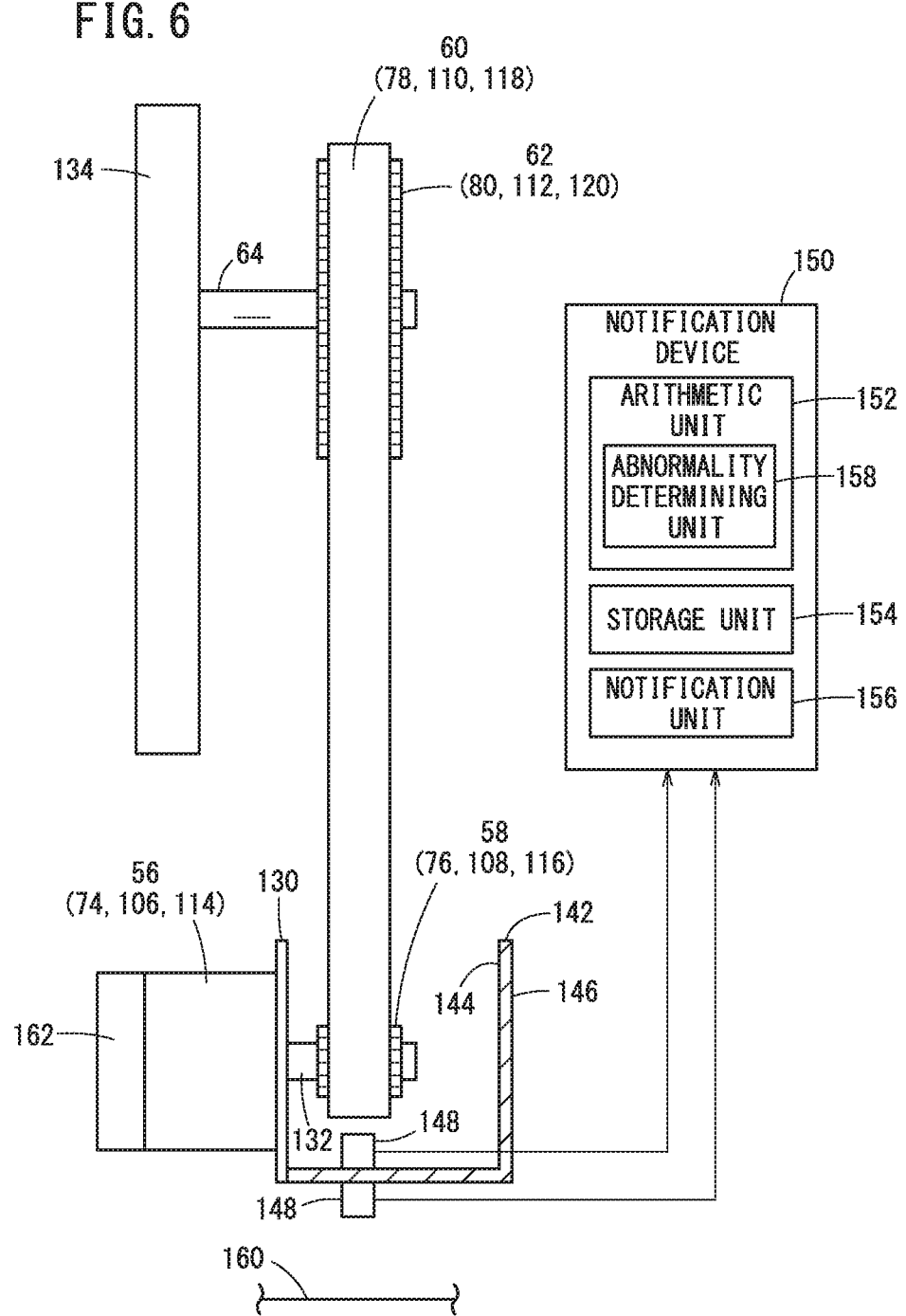
FIG. 6 is a schematic diagram illustrating the position of a sensor and the configuration of a notification device in the belt transmission mechanism of FIG. 3.
Figure 7:
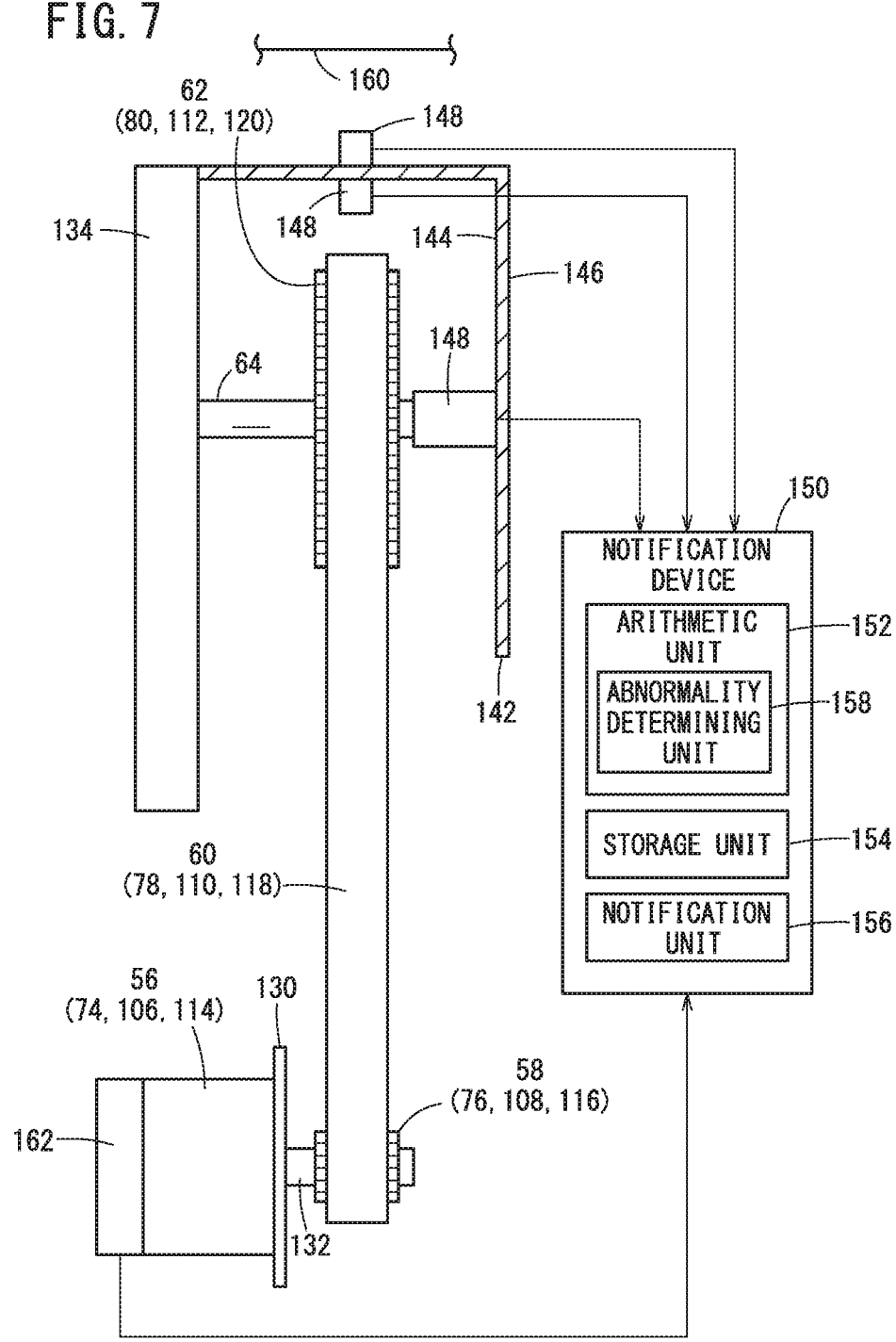
FIG. 7 is a schematic diagram illustrating the position of a sensor and the configuration of a notification device in the belt transmission mechanism of FIG. 4.
Figure 8:
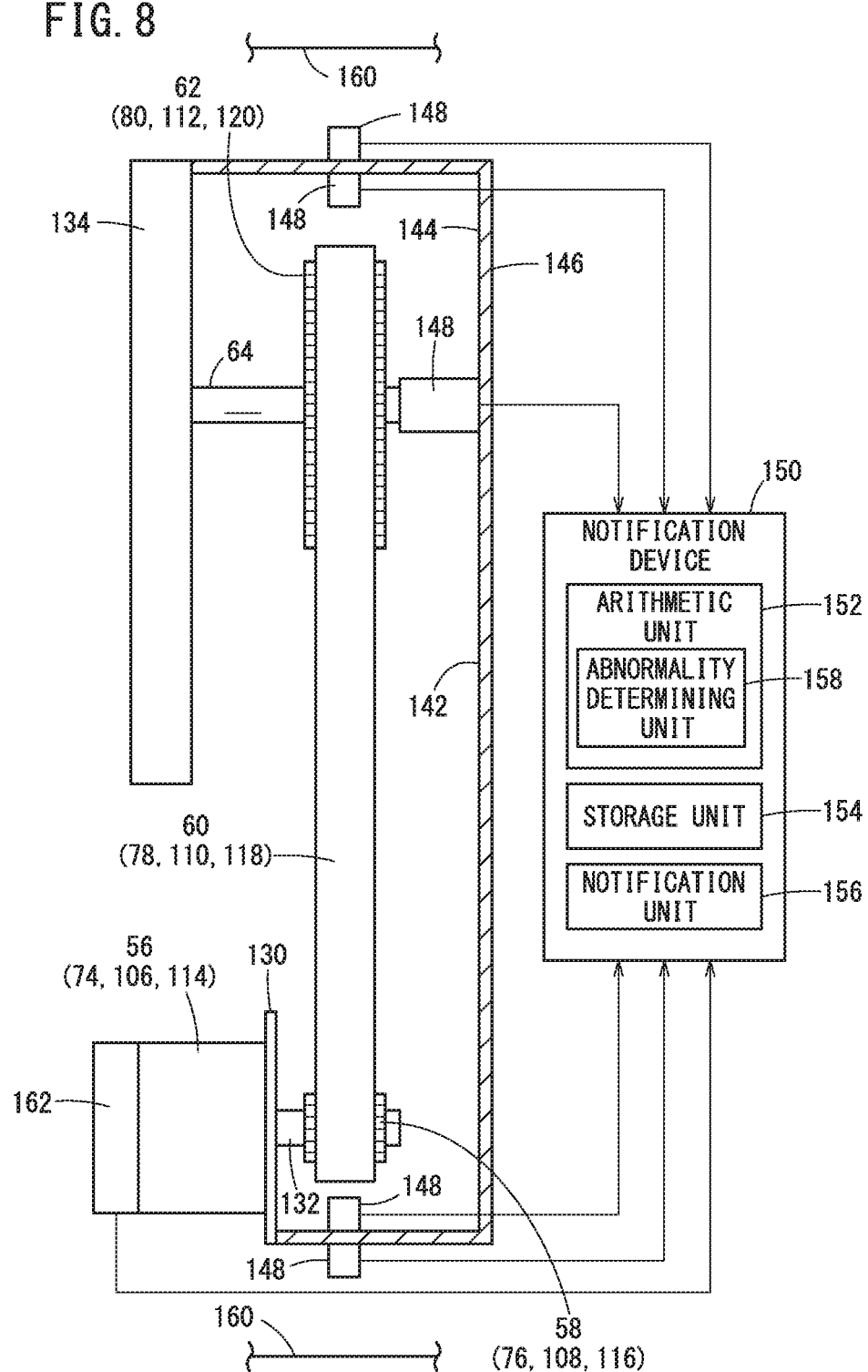
FIG. 8 is a schematic diagram illustrating the position of a sensor and the configuration of a notification device in the belt transmission mechanism of FIG. 5.

As shown in FIGS. 6 to 8, a sensor 148 is attached on an inner wall surface 144 or an outer wall surface 146 of the cover 142. The sensor 148 detects a change in condition that occurs due to an abnormality of the belt 60, thus detecting the abnormality occurring before the belt 60 breaks. For example, the sensor 148 can be a displacement meter, a thermometer, a microphone, a vibration meter, a rotary encoder 164 (FIG. 9), a camera, or the like. A description will be given below about an attachment position for the sensor 148.

[3.1.1. Displacement Meter]

The displacement meter can be of non-contact type, such as a laser displacement meter, for example. The displacement meter can be attached to the cover 142 covering part of the belt 60 on the driving shaft side (FIG. 6), the cover 142 covering part of the belt 60 on the driven shaft side (FIG. 7), and the cover 142 covering the entirety of the belt 60 (FIG. 8). The displacement meter can be attached to either of the inner wall surface 144 and the outer wall surface 146 of the cover 142.

[3.1.2. Thermometer]

The thermometer can be of contact type, such as a thermocouple or a thermistor etc., or of non-contact type, such as a radiation thermometer, for example. The thermometer can be attached to the cover 142 covering part of the belt 60 on the driving shaft side (FIG. 6), the cover 142 covering part of the belt 60 on the driven shaft side (FIG. 7), and the cover 142 covering the entirety of the belt 60 (FIG. 8). The thermometer can be attached to either of the inner wall surface 144 and the outer wall surface 146 of the cover 142.

[3.1.3 Microphone]

The microphone can be attached to the cover 142 covering part of the belt 60 on the driving shaft side (FIG. 6), the cover 142 covering part of the belt 60 on the driven shaft side (FIG. 7), and the cover 142 covering the entirety of the belt 60 (FIG. 8). The microphone can be attached to either of the inner wall surface 144 and the outer wall surface 146 of the cover 142.

[3.1.4. Vibration Meter]

The vibration meter can be mechanical, electromagnetic, piezoelectric, optical, or electromagnetic wave type. The vibration meter can be attached to all of the cover 142 covering part of the belt 60 on the driving shaft side (FIG. 6), the cover 142 covering part of the belt 60 on the driven shaft side (FIG. 7), and the cover 142 covering the entirety of the belt 60 (FIG. 8). The vibration meter can be attached to either of the inner wall surface 144 and the outer wall surface 146 of the cover 142.

[3.1.5 Rotary Encoder 164]

Figure 9:
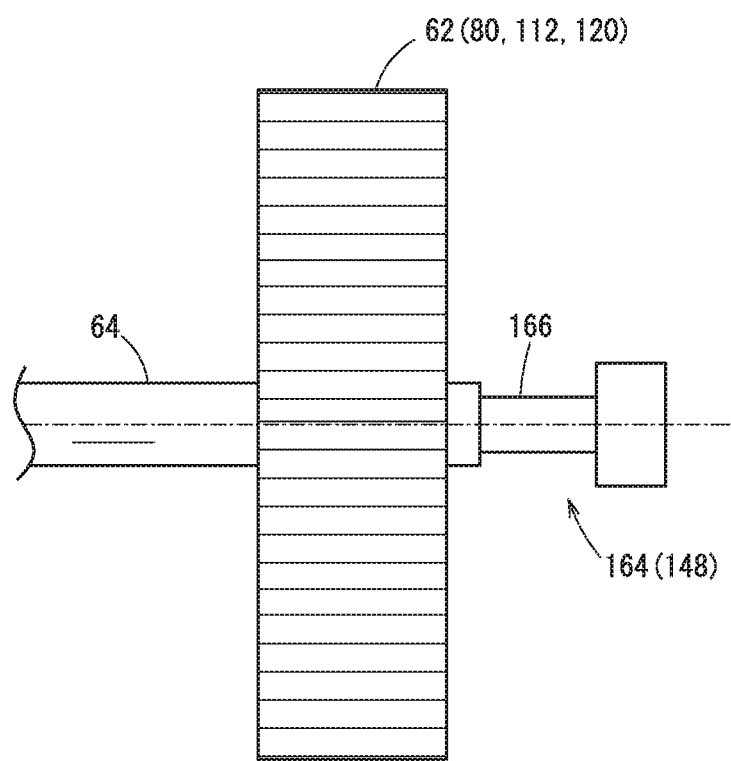
FIG. 9 is a schematic diagram illustrating the arrangement of a rotary encoder on the driven shaft.

The rotary encoder 164 can be attached to the inner wall surface 144 of the cover 142 covering part of the belt 60 on the driven shaft side (FIG. 7), and the inner wall surface 144 of the cover 142 covering the entirety of the belt 60 (FIG. 8). The rotary encoder 164 is disposed on the inner wall surface 144 of the cover 142 in a position on the axis line of the driven shaft, i.e., of the ball screw 64. Further, as shown in FIG. 9, the shaft 166 (rotary shaft) of the rotary encoder 164 is disposed on the axis line of the driven pulley 62 and connected to the ball screw 64. The shaft 166 (rotary shaft) may be connected to the ball screw 64 through a shaft coupling, bolt, nut, spacer, etc.

[3.1.6 Camera]

The camera can be a webcam, for example. The camera can be attached to the inner wall surface 144 of the cover 142 covering part of the belt 60 on the driving shaft side (FIG. 6), the inner wall surface 144 of the cover 142 covering part of the belt 60 on the driven shaft side (FIG. 7), and the inner wall surface 144 of the cover 142 covering the entirety of the belt 60 (FIG. 8). Note that the camera is disposed so as to capture an image of a part where the belt 60 and the driving pulley 58 mesh with each other or a part where the belt 60 and the driven pulley 62 mesh with each other.

[3.2. Notification Device 150]

As shown in FIGS. 6 to 8, the sensor 148 outputs detected information to a notification device 150 by wired communication or by wireless communication. The notification device 150 may be a controller provided in the injection molding machine 10 or may be a personal computer or mobile device (a tablet terminal, smartphone, etc.).

The notification device 150 includes an input unit (not shown), an arithmetic unit 152, a storage unit 154, and a notification unit 156. The input unit includes a device through which the operator inputs information, such as a touchscreen panel or keyboard, for example. The arithmetic unit 152 includes a processor such as a CPU, for example. The arithmetic unit 152 functions as an abnormality determining unit 158 by executing a program stored in the storage unit 154. The storage unit 154 includes various types of memory. The storage unit 154 stores, as well as various programs, a given range concerning the values detected by the sensor 148 when the belt 60 is normal (hereinafter referred to as a normal range) for each type of sensor 148. The notification unit 156 includes one or both of a display device and a speaker device.

[3.3. Operations of Notification Device 150]

[3.3.1. Operations of Notification Device 150 with Displacement Meter Used]

Referring to FIGS. 6 to 8, operations of the notification device 150 in cases where a displacement meter is used as the sensor 148 will be described. Abnormalities of the belt 60, such as wear, elongation, cracks, etc., increase the vibration of the belt 60. This increases the amount of displacement of the belt 60. This also increases the amount of displacement of the cover 142 that receives the vibration of the belt 60 through the motor bracket 130 or the holding plate 134. In the case of being attached to the inner wall surface 144 of the cover 142, the displacement meter irradiates the belt 60 with a laser beam to thereby detect the amount of displacement of the belt 60 relative to the cover 142. In the case of being attached to the outer wall surface 146 of the cover 142, the displacement meter irradiates a reference portion 160 provided outside of the cover 142 with a laser beam to thereby detect the amount of displacement of the cover 142 relative to the reference portion 160.

The storage unit 154 has stored therein, as the normal range, a range of the amount of displacement of the belt 60 in the absence of abnormality of the belt 60, or a range of the amount of displacement of the cover 142 in the absence of abnormality of the belt 60. The abnormality determining unit 158 compares the amount of displacement of the belt 60 detected by the displacement meter and the upper limit value of the amount of displacement of the belt 60 stored in the storage unit 154. Alternatively, the abnormality determining unit 158 compares the amount of displacement of the cover 142 detected by the displacement meter and the upper limit value of the amount of displacement of the cover 142 stored in the storage unit 154. If the amount of displacement detected by the displacement meter exceeds the upper limit value, then the abnormality determining unit 158 determines that an abnormality has occurred on the belt 60, and outputs a notification command to the notification unit 156. According to the notification command, the notification unit 156 notifies the operator of the occurrence of the abnormality of the belt 60.

[3.3.2. Operations of Notification Device 150 with Thermometer Used]

Referring to FIGS. 6 to 8, operations of the notification device 150 in cases where a thermometer is used as the sensor 148 will be described. Abnormalities of the belt 60, such as wear, elongation, cracks, etc., increase the vibration of the belt 60. This increases vibrations of components coupled to the belt 60 and increases the amount of heat generated due to the vibrations. Accordingly, the temperature of the belt 60, the temperature of the cover 142, and the temperature of the atmosphere inside the cover 142 increase. A non-contact type thermometer attached to the inner wall surface 144 of the cover 142 detects the temperature of the belt 60. A contact type thermometer attached to the inner wall surface 144 of the cover 142 detects the temperature of the inner wall surface 144 of the cover 142 or the temperature of the atmosphere inside the cover 142. A contact type thermometer attached to the outer wall surface 146 of the cover 142 detects the temperature of the outer wall surface 146 of the cover 142.

The storage unit 154 has stored therein, as the normal range, a range of the temperature of the belt 60 in the absence of abnormality of the belt 60, or a range of the temperature of the cover 142 in the absence of abnormality of the belt 60, or a range of the temperature of the atmosphere inside the cover 142 in the absence of abnormality of the belt 60. The abnormality determining unit 158 compares the temperature of the belt 60 detected by the thermometer and the upper limit value of the temperature of the belt 60 stored in the storage unit 154. Alternatively, the abnormality determining unit 158 compares the temperature of the cover 142 detected by the thermometer and the upper limit value of the temperature of the cover 142 stored in the storage unit 154. Alternatively, the abnormality determining unit 158 compares the temperature of the atmosphere inside the cover 142 detected by the thermometer and the upper limit value of the temperature of the atmosphere inside the cover 142 stored in the storage unit 154. If the temperature detected by the thermometer exceeds the upper limit value, then the abnormality determining unit 158 determines that an abnormality has occurred on the belt 60 and outputs a notification command to the notification unit 156. According to the notification command, the notification unit 156 notifies the operator of the occurrence of the abnormality of the belt 60.

[3.3.3. Operations of Notification Device 150 with Microphone Used]

Referring to FIGS. 6 to 8, operations of the notification device 150 in cases where a microphone is used as the sensor 148 will be described. Abnormalities of the belt 60, such as wear, elongation, cracks, etc., increase the vibration of the belt 60. This increases the sound pressure level of the sound generated from the belt 60, the driving pulley 58, and the driven pulley 62. The microphone detects the sound pressure level of the sound generated in the vicinity of the cover 142.

The storage unit 154 has stored therein, as the normal range, a range of the sound pressure level of the sound generated in the vicinity of the cover 142 in the absence of abnormality of the belt 60. The abnormality determining unit 158 converts the information concerning the sound in the vicinity of the cover 142 outputted from the microphone into the sound pressure level, and compares it with the upper limit value of the normal range stored in the storage unit 154. If the converted sound pressure level exceeds the upper limit value, then the abnormality determining unit 158 determines that an abnormality has occurred on the belt 60 and outputs a notification command to the notification unit 156. According to the notification command, the notification unit 156 notifies the operator of the occurrence of the abnormality of the belt 60.

[3.3.4. Operations of Notification Device 150 with Vibration Meter Used]

Referring to FIGS. 6 to 8, operations of the notification device 150 in cases where a vibration meter is used as the sensor 148 will be described. Abnormalities of the belt 60, such as wear, elongation, cracks, etc., vary the vibration of the belt 60. This varies vibration of the cover 142 that receives the vibration of the belt 60 through the motor bracket 130 or the holding plate 134. The vibration meter detects the vibration of the cover 142.

The storage unit 154 has previously stored therein, as the normal range, a range of the amount of vibration (e.g., frequency or amplitude) of the cover 142 in the absence of abnormality of the belt 60. The abnormality determining unit 158 compares the amount of vibration detected by the vibration meter and the upper limit value of the normal range stored in the storage unit 154. If the amount of vibration detected by the vibration meter exceeds the upper limit value, then the abnormality determining unit 158 determines that an abnormality has occurred on the belt 60 and outputs a notification command to the notification unit 156. According to the notification command, the notification unit 156 notifies the operator of the occurrence of the abnormality of the belt 60.

[3.3.5. Operations of Notification Device 150 with Rotary Encoder 164 Used]

Referring to FIGS. 7 to 9, operations of the notification device 150 in cases where a rotary encoder 164 is used as the sensor 148 will be described. Occurrence of abnormalities on the belt 60, such as wear, elongation, cracks, etc., reduces the tension of the belt 60. As a result, temporal unmeshed state of the belt 60 occurs on the driving shaft side and the driven shaft side, and hence the drive force transmitted from the driving pulley 58 to the driven pulley 62 is momentarily interrupted. This enlarges the phase difference (speed difference) of the driven pulley 62 relative to the driving pulley 58. The rotary encoder 164 detects the rotational positions of the ball screw 64 and the driven pulley 62.

On the other hand, the servomotor 56 includes a detector that detects the rotational position of the rotary shaft 132 of the servomotor 56. This detector is referred to as a motor-side encoder 162. The motor-side encoder 162 detects the rotational positions of the rotary shaft 132 of the servomotor 56 and the driving pulley 58.

The storage unit 154 has stored therein, as the normal range, a range of the phase difference (speed difference) of the driven shaft relative to the driving shaft in the absence of abnormality of the belt 60. The abnormality determining unit 158 obtains the phase difference of the driven shaft with respect to the driving shaft, on the basis of the information outputted from the motor-side encoder 162 and the information outputted from the rotary encoder 164 as the sensor 148, and compares it with the upper limit value of the normal range stored in the storage unit 154. If the phase difference obtained exceeds the upper limit value, then the abnormality determining unit 158 determines that an abnormality has occurred on the belt 60 and outputs a notification command to the notification unit 156. According to the notification command, the notification unit 156 notifies the operator of the occurrence of the abnormality on the belt 60.

[3.3.6. Operations of Notification Device 150 with Camera Used]

Referring to FIGS. 6 to 8, operations of the notification device 150 in cases where a camera is used as the sensor 148 will be described. Occurrence of abnormalities on the belt 60, such as wear, elongation, cracks, etc., reduces the tension of the belt 60. As a result, temporal unmeshed state of the belt 60 occurs on the driving pulley 58 or the driven pulley 62. The camera captures an image of the unmeshed state of the belt 60 in the position where the driving pulley 58 and the belt 60 mesh with each other, or captures an image of the unmeshed state of the belt 60 in the position where the driven pulley 62 and the belt 60 mesh with each other.

The information outputted from the camera is displayed in real time on a display of the notification unit 156.

4. Other Embodiments

The sections [2] and [3] above have described the mold opening/closing mechanism 55 as an example of the belt transmission mechanisms. However, the ejector mechanism 72, the screw drive mechanism 104, and the injection mechanism 105 shown in FIG. 1 are also belt transmission mechanisms. Accordingly, the ejector mechanism 72, the screw drive mechanism 104, and the injection mechanism 105 may be provided with the cover 142 shown in FIGS. 3 to 8 and the sensor 148 and the notification device 150 shown in FIGS. 6 to 8.

The belt 60 may be a friction transmission belt in place of a synchronous power transmission belt.

5. Invention Obtained from Embodiments

The invention graspable from the embodiments described above will be recited below.

An aspect of the present invention provides an injection molding machine 10 including a belt transmission mechanism (mold opening/closing mechanism 55, ejector mechanism 72, screw drive mechanism 104, injection mechanism 105) configured to transmit drive force from a driving shaft (driving pulley 58, 76, 108, 116) to a driven shaft (driven pulley 62, 80, 112, 120) by use of a belt 60, 78, 110, 118. The injection molding machine 10 includes: a cover 142 covering part or entirety of the belt 60, 78, 110, 118; and a sensor 148 attached to the cover 142 and configured to detect an abnormality of the belt 60, 78, 110, 118.

According to the configuration above, the sensor 148 detects a change in condition caused by an abnormality of the belt 60, 78, 110, 118, so that abnormalities of the belt 60, 78, 110, 118 can be found in the early stages. Further, according to the configuration above, the sensor 148 is attached to the cover 142 covering the belt 60, 78, 110, 118, so that the cover 142 can be utilized as part of the detection device for detecting abnormalities of the belt 60, 78, 110, 118. Moreover, according to the configuration above, it is possible to prevent increase in the size of the injection molding machine 10.

In the aspect of the invention, the sensor 148 may be one of: a displacement meter configured to detect displacement of the cover 142 or displacement of the belt 60, 78, 110, 118; a thermometer configured to detect temperature; a microphone configured to detect a sound pressure level; and a vibration meter configured to detect vibration of the cover 142.

In the aspect of the invention, the sensor 148 may be a rotary encoder 164 configured to detect a rotational position of the driven shaft (driven pulley 62, 80, 112, 120), and the rotary encoder 164 may have a rotary shaft (shaft 166) aligned in the same straight line with an axis line of the driven shaft.

In the aspect of the invention, the sensor 148 may be a camera configured to capture an image of the belt 60, 78, 110, 118.

In the aspect of the invention, the injection molding machine 10 may further include a notification unit 156 configured to give notification of a result detected by the sensor 148.

The configuration above enables the operator to recognize presence/absence of an abnormality of the belt 60, 78, 110, 118 without directly monitoring the belt 60, 78, 110, 118.

In the aspect of the invention, the injection molding machine 10 may further include: an abnormality determining unit 158 configured to determine that an abnormality has occurred on the belt 60, 78, 110, 118 if a value detected by the sensor 148 is out of a given range; and a notification unit 156 configured to give notification when the abnormality determining unit 158 detects an abnormality of the belt 60, 78, 110, 118.

The configuration above enables the operator to recognize the occurrence of an abnormality on the belt 60, 78, 110, 118.

In the aspect of the invention, the injection molding machine 10 may further include: a servomotor 56, 74, 106, 114 configured to rotate the driving shaft (driving pulley 58, 76, 108, 116) and detect a rotational position of the driving shaft; an abnormality determining unit 158 configured to obtain a phase difference between the driving shaft and the driven shaft (driven pulley 62, 80, 112, 120) from the rotational position of the driving shaft detected by the servomotor 56, 74, 106, 114 and the rotational position of the driven shaft detected by the rotary encoder 164, and to determine that an abnormality has occurred on the belt 60, 78, 110, 118 if the phase difference is out of a given range; and a notification unit 156 configured to give notification when the abnormality determining unit 158 detects an abnormality of the belt 60, 78, 110, 118.

The configuration above enables the operator to recognize the occurrence of an abnormality on the belt 60, 78, 110, 118.

In the aspect of the invention, the belt transmission mechanism (mold opening/closing mechanism 55) may be a mechanism that moves a crosshead 50 of a toggle link 36 forward and backward by rotation of the driven shaft (driven pulley 62) to thereby open and close a mold 30.

In the aspect of the invention, the belt transmission mechanism (ejector mechanism 72) may be a mechanism that moves forward and backward an ejector pin 88 for ejecting a molded article from a movable mold 34 by rotation of the driven shaft (driven pulley 80).

In the aspect of the invention, the belt transmission mechanism (screw drive mechanism 104) may be a mechanism that rotates a screw 96 of an injection unit 97 by rotation of the driven shaft (driven pulley 112) to thereby supply a resin material into a cylinder 94.

In the aspect of the invention, the belt transmission mechanism (injection mechanism 105) may be a mechanism that moves a screw 96 of an injection unit 97 forward and backward by rotation of the driven shaft (driven pulley 120) to thereby inject a resin material from a cylinder 94 into a mold 30.

In the aspect of the invention, the belt 60, 78, 110, 118 may be a synchronous power transmission belt.

The configuration of the injection molding machine according to the present invention is not limited to those of the embodiments described above but can of course adopt various configurations without departing from the essence and gist of the present invention.

What is claimed is:

1. An injection molding machine including a belt transmission mechanism configured to transmit drive force from a driving shaft to a driven shaft by use of a belt, the injection molding machine comprising:
    a cover covering part of the belt such that one of the driving shaft and the driven shaft is exposed from the cover; and
    a sensor attached to the cover and configured to detect an abnormality of the belt,
    wherein the sensor is
        a displacement sensor configured to detect displacement of the cover.

2. The injection molding machine according to claim 1, further comprising one or more processors that execute a computer-executable instruction stored in memory,
    wherein the one or more processors execute the computer-executable instruction to cause the injection molding machine to give notification of a result detected by the sensor.

3. The injection molding machine according to claim 1, further comprising:
    one or more processors that execute a computer-executable instruction stored in memory,
    wherein the one or more processors execute the computer-executable instruction to cause the injection molding machine to:
        determine that an abnormality has occurred on the belt if a value detected by the sensor is out of a given range; and
        give notification when the abnormality determining unit detects the abnormality of the belt.

4. The injection molding machine according to claim 1, wherein the belt transmission mechanism moves a crosshead of a toggle link forward and backward by rotation of the driven shaft to thereby open and close a mold.

5. The injection molding machine according to claim 1, wherein the belt transmission mechanism moves forward and backward an ejector pin configured to eject a molded article from a movable mold by rotation of the driven shaft.

6. The injection molding machine according to claim 1, wherein the belt transmission mechanism rotates a screw of an injection unit by rotation of the driven shaft to thereby supply a resin material into a cylinder.

7. The injection molding machine according to claim 1, wherein the belt transmission mechanism moves a screw of an injection unit forward and backward by rotation of the driven shaft to thereby inject a resin material from a cylinder into a mold.

8. The injection molding machine according to claim 1, wherein the belt comprises a synchronous power transmission belt.

9. The injection molding machine according to claim 3, wherein the belt transmission mechanism moves a crosshead of a toggle link forward and backward by rotation of the driven shaft to thereby open and close a mold.

10. The injection molding machine according to claim 3, wherein the belt transmission mechanism moves forward and backward an ejector pin configured to eject a molded article from a movable mold by rotation of the driven shaft.

11. The injection molding machine according to claim 3, wherein the belt transmission mechanism rotates a screw of an injection unit by rotation of the driven shaft to thereby supply a resin material into a cylinder.

12. The injection molding machine according to claim 3, wherein the belt transmission mechanism moves a screw of an injection unit forward and backward by rotation of the driven shaft to thereby inject a resin material from a cylinder into a mold.

13. The injection molding machine according to claim 1,
    wherein the displacement sensor is attached to an outer wall surface, wherein the displacement sensor irradiates a reference portion provided outside of the cover with a laser beam to thereby detect an amount of displacement of the cover relative to the reference portion, and
    wherein a thermometer is attached to one of:
        the inner wall surface of the cover, wherein the thermometer detects the temperature of the inner wall surface of the cover or the temperature of an atmosphere inside the cover; and
        the outer wall surface, wherein the thermometer detects the temperature of the outer wall surface of the cover.

14. An injection molding machine including a belt transmission mechanism configured to transmit drive force from a driving shaft to a driven shaft by use of a belt, the injection molding machine comprising:
    a cover covering part of the belt such that one of the driving shaft and the driven shaft is exposed from the cover; and a sensor attached to the cover and configured to detect an abnormality of the belt, wherein the sensor includes a displacement sensor configured to detect displacement of the cover, and wherein the displacement sensor is attached to an outer wall surface, wherein the displacement sensor irradiates a reference portion provided outside of the cover with a laser beam to thereby detect an amount of displacement of the cover relative to the reference portion.

* * * * *

UNITED STATES PATENT AND TRADEMARK OFFICE
CERTIFICATE OF CORRECTION

PATENT NO. : 11,840,004 B2
APPLICATION NO. : 17/003618
DATED : December 12, 2023
INVENTOR(S) : Keisuke Sugahara et al.

It is certified that error appears in the above-identified patent and that said Letters Patent is hereby corrected as shown below:

In the Claims

In Column 12, Lines 7-8 of Claim 3 should read as follows:
"give notification when the abnormality of the belt is detected"

Signed and Sealed this
Twentieth Day of February, 2024

Katherine Kelly Vidal
*Director of the United States Patent and Trademark Office*